(12) United States Patent
Doerr et al.

(10) Patent No.: US 7,653,306 B2
(45) Date of Patent: Jan. 26, 2010

(54) MULTIPLE PORT SYMMETRIC TRANSMISSIVE WAVELENGTH-SELECTIVE MESH NODE

(75) Inventors: Christopher Richard Doerr, Middletown, NJ (US); Gordon Thomas Wilfong, Bedminster, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 530 days.

(21) Appl. No.: 11/434,919

(22) Filed: May 16, 2006

(65) Prior Publication Data

US 2007/0269210 A1    Nov. 22, 2007

(51) Int. Cl.
*H04J 14/00*    (2006.01)
(52) U.S. Cl. ........................................ 398/49
(58) Field of Classification Search .............. 398/48–50
See application file for complete search history.

(56) References Cited

U.S. PATENT DOCUMENTS

2002/0186434 A1* 12/2002 Roorda et al. ............... 359/128

* cited by examiner

Primary Examiner—Shi K Li
(74) Attorney, Agent, or Firm—Brosemer, Kolefas & Associates

(57) ABSTRACT

Transmissive WSS-based mesh nodes of degree N, N≧3, includes N node port apparatuses connected to provide a multiple wavelength channel signal with reciprocal connectivity between the N node ports. Each node port apparatus has an input port and N−1 output ports and comprises either (1) a coupler connected to said input port and having N−1 outputs, (2) a transmissive 1×(N−1) WSS connected to said input port and responsive to a control signal C for establishing a switching connection to one of its N−1 outputs, or (3) a coupler connected to said input port and having X+1 outputs including one output connected to an input of a transmissive 1×Y WSS having Y outputs, where X+Y equals N−1, the sum of the remaining X outputs of the coupler and the Y outputs of the transmissive 1×Y WSS being the N−1 output ports of the node port apparatus. Each of the N−1 output ports from each node port apparatus is connected to a different output port of each of the other N−1 node port apparatuses such that a connection made from one input port of a node port apparatus to an input port of a different node port apparatus always passes through only one WSS and at least one coupler, the connection being established in response to a control signal applied to said one WSS.

3 Claims, 3 Drawing Sheets

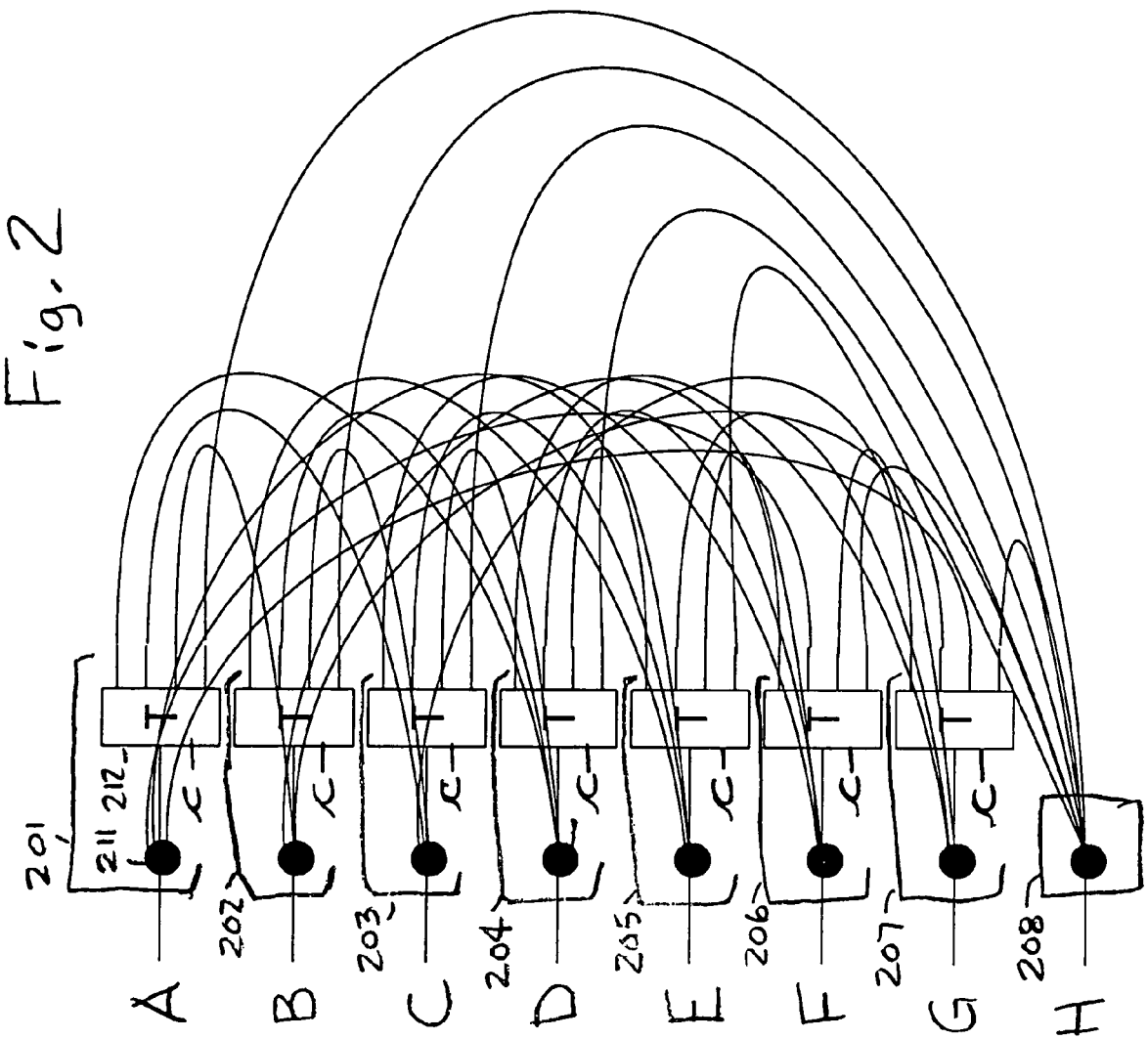

MULTIPLE PORT SYMMETRIC TRANSMISSIVE WAVELENGTH-SELECTIVE MESH NODE

CROSS-REFERENCE TO RELATED APPLICATIONS

This application is related to the concurrently filed U.S. patent application Ser. No. 11/434,938, Multiple Port Symmetric ReflectiveWavelength-Selective Mesh Node, filed May 16, 2006, which is incorporated by reference herein.

FIELD OF THE INVENTION

The present invention relates to a wavelength-selective mesh node, and more particularly to a multiple port wavelength-selective mesh node having symmetric wavelength connections using transmissive wavelength-selective switches (WSSs).

BACKGROUND OF THE INVENTION

Today's optical networks are mostly ring-based but are moving toward mesh-based. A mesh architecture has several advantages over a ring architecture, such as more efficient bandwidth utilization, more diverse protection, and less constrained network growth. At the mesh nodes, one would like to be able to route wavelengths arbitrarily, using a wavelength-selective cross connect. The number of fibers entering the node determines its degree.

Wavelength-selective cross connects may be built out of wavelength-selective switches (WSSs). There are two main types of WSSs: transmissive and reflective. In a transmissive WSS, the input is directed in a one-way fashion to one of the K outputs, and the input is clearly distinct from the outputs. An example is the planar lightwave circuit (PLC) 1×9 WSS demonstrated in [1]. (Note, a reference number in a bracket [ ] refers to a publication listed in the attached Reference list.) In a reflective WSS, the input is reflected back by a steering mirror, being directed to one of the K outputs; and the input is not distinct from the outputs. An example is the 1×4 WSS demonstrated in [2], which used a bulk grating and micro-electro mechanical systems (MEMS) tilt mirrors. Another example is one using a vertical stack[3] or horizontal arrangement[4] of PLCs and MEMS tilt mirrors.

While the designs of such reflective WSS based mesh nodes have proven to be highly flexible, their complexity increases significantly with increasing numbers of ports. Moreover, since in reflective WSS based mesh node designs the stray connections become almost unmanageable for nodes with degree higher than 6, such designs are limited to degree 6 nodes. Thus there is continuing need to simplify the design WSS-based mesh nodes.

SUMMARY OF THE INVENTION

We have recognized that if we enforce a symmetric demand, e.g., if a wavelength is routed from A to B then it must also be routed from B to A, then we can greatly simplify the design of degree-3 and higher transmissive WSS-based mesh nodes. Our degree-5 and higher transmissive WSS based mesh nodes reduces the WSS count and WSS port count over what is available with degree-5 and higher reflective WSS based mesh nodes.

More particularly, in accordance with the present invention, we disclose a non-blocking N port optical connection mesh node, N≧3, for providing a multiple wavelength channel signal with reciprocal bidirectional connectivity between the N node ports, each node port containing an apparatus having an input port and N−1 output ports and comprising either (1) a coupler having an input connected to said input port and having N−1 outputs, (2) a transmissive 1×(N−1) WSS having an input connected to said input port and responsive to a control signal C for establishing a switching connection to one of its N−1 outputs, or (3) a coupler having an input connected to said input port and having X+1 outputs including one output connected to a input of a transmissive 1×Y WSS having Y outputs, where X+Y equals N−1, the sum of the remaining X outputs of the coupler and the Y outputs of the transmissive 1×Y WSS being the N−1 output ports of the node port apparatus, and wherein the node port apparatus provides a total of N−1 output ports and where each of the N−1 output ports from each node port apparatus is connected to a different output port of each of the other N−1 node port apparatuses such that a connection made from one input port of a node port apparatus to an input port of a different node port apparatus always passes through only one WSS and at least one coupler, the connection being established in response to a control signal applied to said one WSS.

Another embodiment provides an optical mesh node wherein when N is an odd number, each node port apparatus is implemented with the same sized coupler and transmissive 1×K$_i$ WSS. Yet another embodiment provides an optical mesh node wherein when N is an even number, one node includes only a 1×(N−1) coupler and each of the other N−1 node port apparatuses is implemented with the same sized coupler and transmissive 1×K$_i$ WSS.

BRIEF DESCRIPTION OF THE FIGURES

Other aspects, features, and advantages of the present invention will become more fully apparent from the following detailed description, the appended claims, and the accompanying drawings in which:

FIG. 2 illustratively shows one embodiment of our degree-8 non-blocking optical connection mesh node using transmissive WSS's.

DETAILED DESCRIPTION

We have recognized that if we use transmissive WSS's and enforce symmetric demands then the N port optical mesh node designs for any degree can be less complex than comparable mesh nodes with non-symmetric demands (i.e., conventional mesh nodes), and designs with N≧3 can be less complex than comparable reflective WSS-based mesh nodes, because we no longer need to worry about stray connections. The design of a transmissive WSS based N port optical mesh node for any N>4 must satisfy two Criteria. Criterion #1, is that no connection in the node can directly connect two couplers. A second criterion, Criterion #2, is.

$$\sum_{i=1}^{M} K_i \le \frac{N(N-1)}{2} - \frac{(N-M)(N-M-1)}{2}$$

where M is all numbers between 1 and N. Criterion #2 puts an upper limit on the size $K_i$ of the transmissive WSSs used in the actual mesh node design.

Figure 1B:
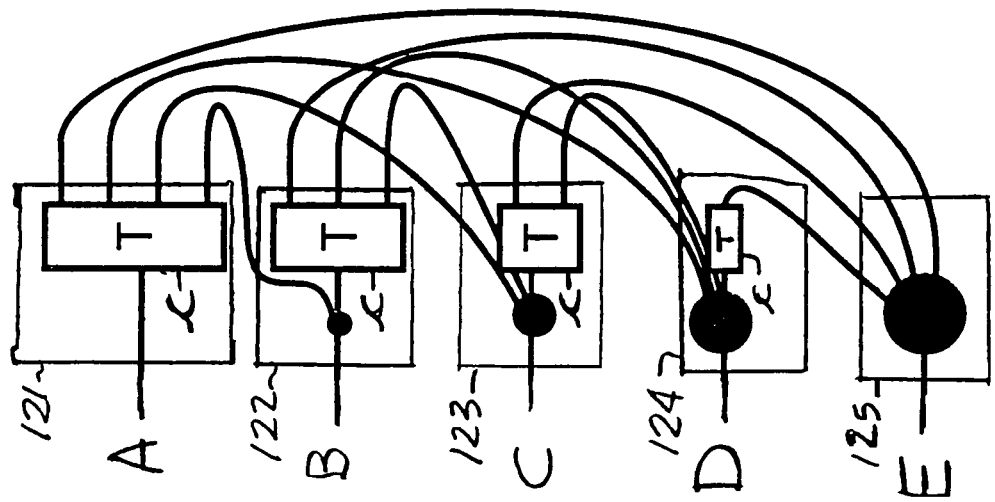
FIGS. 1A and 1B illustratively show, in accordance with the present invention, two embodiments for a degree-5 non-blocking optical connection mesh node using transmissive WSS's.
Figure 1A:
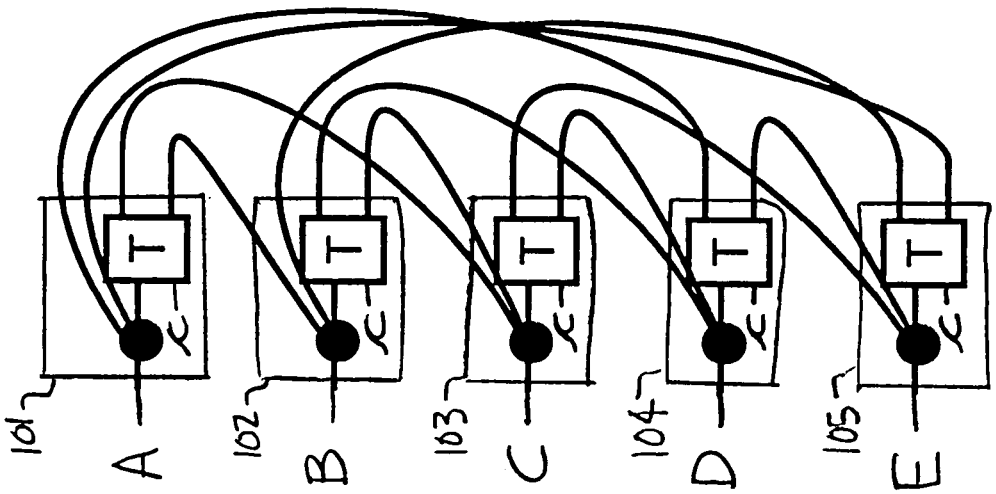

For example, for a degree-5 node (i.e., N=5), the distribution of $K_i$ could be 2,2,2,2,2 or 4,3,2,1,0 for the five WSS's. This is because 2+2+2+2+2=4+3+2+1+0=5×(5−1)/2, satisfying Criterion #2, when M=N=5. They also satisfy Criterion #2 for M=4, 3, 2, and 1. As will be discussed in a later paragraph, other $K_i$ distributions choices for a degree-5 node are possible. For these two cases, the mesh node designs are shown in FIGS. 1A and 1B, respectively. An advantage of the $K_i$=4,3,2,1,0 design is that it has one node apparatus has a WSS with $K_i$=0, (i.e., no WSS is used at that node apparatus) and thus the mesh node requires only four WSS's (one at each of four other node apparatuses). Note that there can be only one WSS with $K_i$=0 in any design because of Criterion #1. For N=5, Criterion #2 requires that $K_i$<4, thus the largest size of the WSSs used should be less than or equal to 4, which is satisfied both design examples.

Shown in FIGS. 1A and 1B are two illustrative mesh node designs of our novel non-blocking N port optical connection mesh node, N=5, using transmissive WSS's. FIG. 1A illustrates the mesh node design using all 1×2 transmissive WSSs, i.e., $K_i$=2,2,2,2,2, and FIG. 1B illustrates a mesh node design using different sized transmissive WSSs, e.g., $K_i$=4,3,2,1,0. Both of the degree-5 mesh nodes of FIGS. 1A and 1B provide a multiple wavelength channel signal with reciprocal bidirectional connectivity between any pairs of the five node ports A-E.

In FIG. 1A, at each node port there is an apparatus, 101-105, each including a 1×3 bidirectional coupler and a 1×2 WSS (T-transmissive) that is controlled by control signal c. Each of the input ports A-E to the node port apparatuses, 101-105, respectively, connects to the input of the 1×3 coupler. As shown, one output of the 1×3 coupler connects to the input of the 1×2 WSS and each of the other two coupler outputs connects to an output of a 1×2 WSS of a different node port apparatus. Each of the two outputs of the 1×2 WSS connects to an output of a 1×3 coupler of a different node port apparatus that is not one of the node port apparatuses to which its co-located coupler has an output connection. Thus for example, for apparatus 101, its 1×3 coupler has two outputs that each connects to one the outputs of the 1×2 WSS of either apparatus 104 or 105. And for apparatus 101, the 1×2 WSS has two outputs that each connects to one the outputs of the 1×3 coupler of either apparatus 102 and 103. In this manner, connection paths between each pair of node ports, e.g., AB, always pass through both a 1×2 WSS and a coupler, thereby satisfying Criterion #1. The establishment of a connection path is controlled by the control signal C to the 1×2 WSS in that connection path. Thus, the connection path between nodes AB is established by the 1×2 WSS of node apparatus 101.

In FIG. 1B, each of the node port apparatuses, 121-125, are different. The node port A apparatus 121 includes only a 1×4 WSS that is controlled by control signal c. Each of the four outputs of the 1×4 WSS connects to an output of a coupler of a different node port apparatus. The second node port B connects to apparatus 122 that includes a 1×2 bidirectional coupler and a 1×3 WSS that is controlled by control signal c. As shown, the input port B connects to the input of the 1×2 bidirectional coupler. One output of the 1×2 coupler connects to the input of the 1×3 WSS and the other output connects to an output of 1×4 WSS of apparatus 121. Each of the three outputs of the 1×3 WSS connects to an output of a coupler of a different one of the node port apparatuses 123-125. The third node port C connects to apparatus 123 that includes a 1×3 bidirectional coupler and a 1×2 WSS that is controlled by control signal C. As shown, the input port C connects to the input of the 1×3 bidirectional coupler. One output of the 1×3 coupler connects to the input of the 1×2 WSS and each of the other two outputs connects to an output of either the 1×4 WSS of apparatus 121 or the 1×3 WSS of apparatus 122. Each of the two outputs of the 1×2 WSS connects to an output of a coupler node port of either apparatus 124 or 125. The fourth node port D connects to apparatus 124 that includes a 1×4 bidirectional coupler and a 1×1 WSS that is controlled by control signal c. As shown, the input port D connects to the input of the 1×4 bidirectional coupler. One output of the 1×4 coupler connects to the input of the 1×1 WSS and each of the other three outputs connect either to an output of a 1×4 WSS of apparatus 121, an output of 1×3 WSS of apparatus 122, or the output of a 1×2 WSS of apparatus 123. The output of the 1×1 WSS connects to an output of a coupler of node port apparatuses 125. The fifth node port E connects to apparatus 125 that includes only a 1×4 bidirectional coupler that has an input that connects to the input port E. Each of the four outputs connects to either an output of a 1×4 WSS of apparatus 121, an output of 1×3 WSS of apparatus 122, an output of a 1×2 WSS of apparatus 123, or the output of 1×1 WSS of apparatus 124. The above described connection paths between each pair of node ports, e.g., AE, always pass through both a WSS and a coupler, thereby satisfying Criterion #1. The establishment of each of the connection paths is controlled by the control signal c to the WSS in that connection path.

As previously noted, besides the node configurations 2,2,2,2,2 or 4,3,2,1,0 described above, other configurations of transmissive 1×$K_i$ WSS for a degree-5 node are possible. The possible distributions of $K_i$ for a degree-5 mesh node include:
    4,3,2,1,0
    4,2,2,2,0
    4,2,2,1,1
    3,3,2,2,0
    3,3,2,1,1
    3,2,2,2,1
    2,2,2,2,2

As noted, the degree-5 mesh node configurations that have a WSS with $K_i$=0 advantageously does not require a WSS at that node apparatus, but only requires a coupler. Thus, such a degree-5 mesh node would require only four WSS's, one at each of four node apparatuses.

Since each node apparatus of a degree-5 mesh node has N−1 outputs, the sum of these outputs coming from a coupler and a 1×$K_i$ WSS will total N−1. Thus, the distribution of the size of the coupler utilized in each node apparatus is the N−1 complement of the $K_i$ distributions shown in the above table. This coupler distribution is shown below:
    0,1,2,3,4
    0,2,2,2,4
    0,2,2,3,3
    1,1,2,2,4
    1,1,2,3,3
    1,2,2,2,3
    2,2,2,2,2

The degree-5 mesh node distributions above that have a "0" sized coupler does not require a coupler at that node apparatus, but only requires a 1×4 WSS. However, to equalize losses through the system, one may need to add attenuators or dummy couplers to ports that have smaller or no couplers.

As shown, most of the node apparatuses include both a coupler and a WSS (distributions with a 0 or a 4). At such node apparatuses the coupler has an input connected to the node apparatus input port and have X+1 outputs including one output that connects to an input of a transmissive 1×Y WSS having Y outputs, where X+Y equals N−1. The N−1 output ports of the node port apparatus are the remaining X outputs of the coupler and the Y outputs of the transmissive 1×Y WSS.

It should be noted that while a degree-5 mesh nodes having the distributions 2,2,2,2,2 and 4,3,2,1,0 have been described and shown in FIGS. 1A and 1B, the physical design of the other degree-5 mesh nodes may be implemented in a straight-forward manner using the techniques used in the physical designs of FIGS. 1A and 1B as a guide. Moreover, these three techniques can be extended for any mesh node N>4. Illustratively as will be discussed in a later paragraph, FIG. 2 shows an example of degree-8 mesh node design.

Generally the above described degree-N mesh nodes, where N≧3, can provide a total of N!/[2!(N−2)!] unique connections between pairs of node ports. The total number of switching states for a degree-N mesh node is:

If N is even, the number of states is $N!/[(N/2)!*2^{(N/2)}]$

If N is odd, the number of states is $(N+1)!/[(N+1)/2)!*2^{(N+1)/2}]$

For example, for N=5, 6, 7, and 8 the total number of switch states is 15, 15, 105, and 105, respectively.

When a mesh node includes an odd number of ports of 5 or greater, it is always possible to have a configuration where all node port apparatus uses the same sized WSS (as shown for N=5 by the mesh node configuration 2,2,2,2,2). This is because the right-hand side of Criterion #2 for the case of M=N always produces a number which when divided by N produces a whole number. Thus for N=7, N(N−1)/2=21 which when divided by 7 equals 3 and, hence, the $K_i$ distributions can be 3,3,3,3,3,3,3. For an even number of node ports, N(N−1)/2 produces a number which when divided by N does not produce a whole number. For example, for N=8, N(N−1)/2=28 which when divided by 8 does not produce a whole number. Hence, for N=8, there is no $K_i$ distributions where all the WSS are of the same size. As previously noted, it is desirable to have one port apparatus contain only a coupler, that is one port has $K_i$=0, i.e., no WSS. For our degree-8 mesh node, if one node has $K_i$=0 (only a coupler) then the remaining 7 nodes have WSS that can still satisfy the N(N−1)/2 of Criterion #2. Thus, for N=8, if one node apparatus has no WSS, then the remaining 7 node apparatuses can each have a WSS that is the same size, i.e, N(N−1)/2=28, divided by 7 produces a whole number 4. The resulting degree-8 optical connection mesh node is thus configured as a 4, 4, 4, 4, 4, 4, 4, 0 design.

FIG. 2 illustratively shows an embodiment for our degree-8 non-blocking optical connection mesh node configured using the above described 4, 4, 4, 4, 4, 4, 4, 0 design. Each of seven of the node apparatuses 201-207 includes a 1×4 WSS and a 1×4 coupler and apparatus 208 has only a 1×7 coupler. At each of the apparatuses 201-207, a respective one of the input ports A-G connects to the input of the 1×4 coupler. At each of the apparatuses 201-207, for example apparatus 201, one output port of the 1×4 coupler 211 connects to the input of the 1×4 WSS 212. As shown, each of the other three outputs of 1×4 coupler 211 connects to an output of a different 1×4 WSS of a different node port apparatus. One of the four outputs of the 1×4 WSS connects to the 1×7 coupler of node port H apparatus 208. The three other outputs of the 1×4 WSS each connect to an output of a 1×4 coupler of a different node port apparatus that is not one of the node port apparatuses to which its co-located coupler has an output connection. Thus for example, for apparatus 201, its 1×4 coupler has three outputs that each connects to one the outputs of the 1×4 WSS of either apparatus 205, 206, or 207. And for apparatus 101, its 1×4 WSS has four outputs that each connects to one the outputs of the 1×4 coupler of either apparatus 202, 203, or 204 or to the output of 1×7 coupler 208. In this manner, connection paths between each pair of node ports, e.g., AB, always pass through both a 1×4 WSS and a coupler, thereby satisfying Criterion #1. The establishment of a connection path is controlled by the control signal c to the 1×4 WSS in that connection path.

Figure 3B:
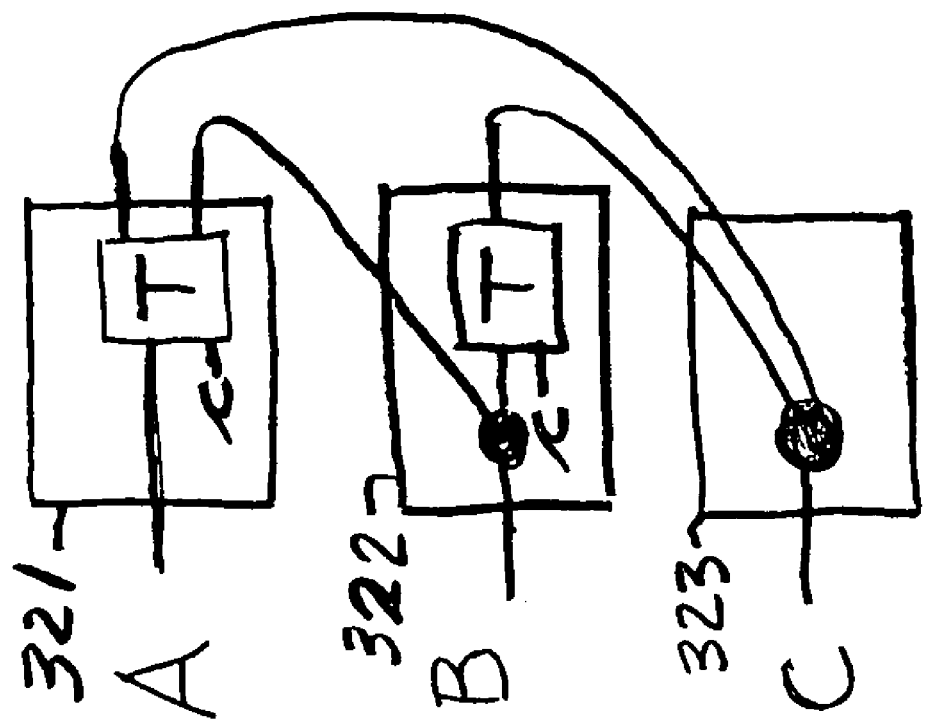
FIGS. 3A and 3B illustratively show, two embodiments for our degree-3 non-blocking optical connection mesh node using transmissive WSS's.
Figure 3A:
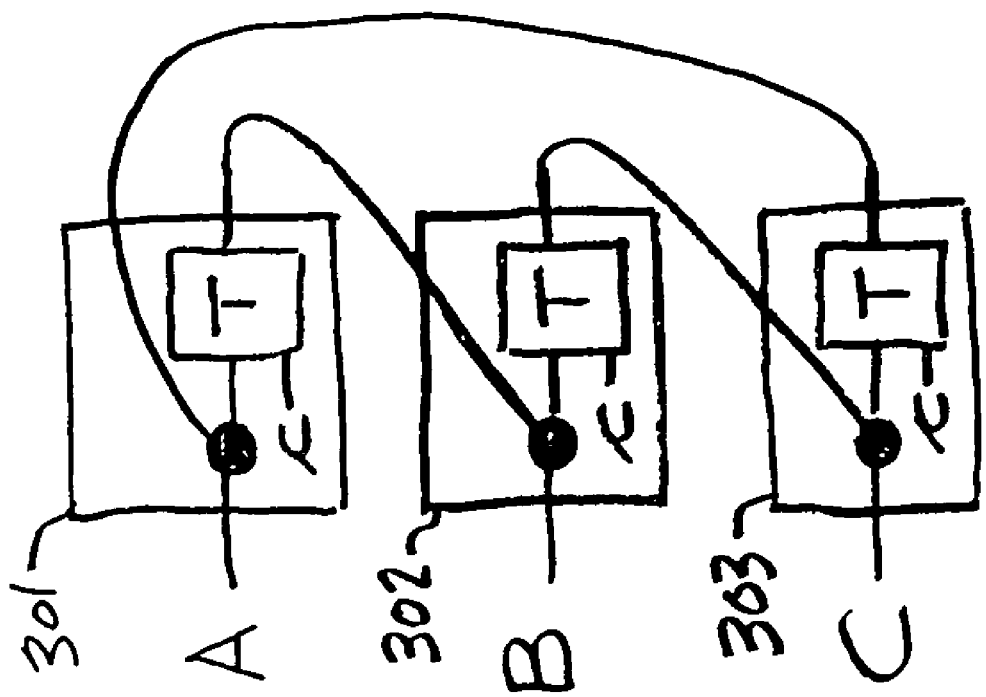

Shown in FIGS. 3A and 3B are two illustrative mesh node designs of our novel non-blocking N port optical connection mesh node, N=3, using transmissive WSS's. FIG. 3A illustrates the mesh node design using all 1×1 transmissive WSSs, i.e., $K_i$=1,1,1, and FIG. 1B illustrates a mesh node design using different sized transmissive WSSs, e.g., $K_i$=2,1,0. Both of the degree-3 mesh nodes of FIGS. 3A and 3B provide a multiple wavelength channel signal with reciprocal bidirectional connectivity between any pairs of the five node ports A-C.

In FIG. 3A, at each node port there is an apparatus, 301-303, each including a 1×2 bidirectional coupler and a 1×1 WSS (T=transmissive) that is controlled by control signal c. Each of the input ports A-C to the node port apparatuses, 301-303, respectively, connects to the input of the 1×2 coupler. As shown, one output of the 1×2 coupler connects to the input of the 1×1 WSS and the other two coupler output connects to an output of a 1×1 WSS of a different node port apparatus. The output of the 1×1 WSS connects to an output of a 1×2 coupler of a different node port apparatus that is not one of the node port apparatuses to which its co-located 1×2 coupler has an output connection. Thus for example, for apparatus 301, its 1×2 coupler has an output that connects to the output of 1×1 WSS of apparatus 303. And for apparatus 301, it 1×1 WSS has an output that connects to one the outputs of the 1×2 coupler of apparatus 302. In this manner, connection paths between each pair of node ports, e.g., AB, always pass through both a 1×1 WSS and a 1×2 coupler, thereby satisfying Criterion #1. The establishment of a connection path is controlled by the control signal c to the 1×1 WSS in that connection path. Thus, the connection path between nodes AB is established by the 1×1 WSS of node apparatus 301.

In FIG. 3B, each of the node port apparatuses, 321-323, are different. The node port A apparatus 321 includes only a 1×2 WSS that is controlled by control signal c. Each of the two outputs of the 1×2 WSS connects to an output of a 1×2 coupler of a different node port apparatus. The second node port B connects to apparatus 122 that includes a 1×2 bidirectional coupler and a 1×1 WSS that is controlled by control signal c. As shown, the input port B connects to the input of the 1×2 bidirectional coupler. One output of the 1×2 coupler connects to the input of the 1×1 WSS and the other output connects to an output of 1×2 WSS of apparatus 321. The output of the 1×1 WSS connects to an output of a coupler of node port apparatus 323. The third node port C connects to apparatus 323 that includes only a 1×2 bidirectional coupler that has an input that connects to the input port E. Each of the two outputs connects to either an output of a 1×2 WSS of apparatus 321, an output of 1×1 WSS of apparatus 322. The above described connection paths between each pair of node ports, e.g., AC, always pass through both a WSS and a coupler, thereby satisfying Criterion #1. The establishment of each of the connection paths is controlled by the control signal c to the WSS in that connection path.

It should be noted that all of the previously described non-blocking N port optical connection mesh node, $N \geq 3$, provide a multiple wavelength channel signal with reciprocal bidirectional connectivity between the N node ports. Each node port contains an apparatus having an input port and N−1 output ports and comprises either (1) only a coupler, only a transmissive WSS, or both a coupler and a transmissive WSS. More specifically, each node port comprises either (1) a coupler having an input connected to said input port and having N−1 outputs, (2) a transmissive 1×(N−1) WSS having an input connected to said input port and responsive to a control signal C for establishing a switching connection to one of its N−1 outputs, or (3) a coupler having an input connected to said input port and having X+1 outputs including one output connected to a input of a transmissive 1×Y WSS having Y outputs, where X+Y equals N−1, the sum of the remaining X outputs of the coupler and the Y outputs of the transmissive 1×Y WSS being the N−1 output ports of the node port apparatus.

The resulting node port apparatus provides a total of N−1 output ports, where each of the N−1 output ports from each node port apparatus is connected to a different output port of each of the other N−1 node port apparatuses such that a connection made from one input port of a node port apparatus to an input port of a different node port apparatus always passes through only one WSS and at least one coupler, the connection being established in response to a control signal applied to said one WSS.

While the physical design of our mesh nodes has been illustrated for two degree-3 and two degree-5 mesh nodes and one degree-8 mesh node, the physical design may be applied to implement any N port optical connection mesh node, N>3, by a person skilled in the art using our two criterion criteria and the design examples shown in FIGS. 1A, 1B, 2, 3A, and 3B.

Thus, it should be understood that this invention is not limited to the particular embodiments disclosed, but it is intended to cover modifications within the spirit and scope of the present invention as defined by the appended claims.

REFERENCES

[1] C. R. Doerr, L. W. Stulz, D. S. Levy, M. Cappuzzo, E. Chen, L. Gomez, E. Laskowski, A. Wong-Foy, and T. Murphy, "Silica-waveguide 1×9 wavelength-selective cross connect," Optical Fiber Communication Conference, postdeadline paper FA3, 2002.

[2] D. M. Marom, et. al., "Wavelength-selective 1×4 switch for 128 WDM channels at 50 GHz spacing," Optical Fiber Communication Conference, paper FB7, 2002.

[3] D. M. Marom, C. R. Doerr, N. R. Basavanhally, M. Cappuzzo, L. Gomez, E. Chen, A. Wong-Foy, and E. Laskowski, "Wavelength-selective 1×2 switch utilizing a planar lightwave circuit stack and a MEMS micromirror array," Optical MEMS 2004, Takamatsu, Japan, Aug. 2004.

[4] T. Ducellier, A. Hnatiw, M. Mala, S. Shaw, A. Mank, D. Touahri, D. McMullin, T. Zami, B. Lavigne, P. Peloso, and O. Leclerc, "Novel high performance hybrid waveguide-MEMS 1×9 wavelength selective switch in a 32-cascade loop experiment," European Conference on Optical Communications, postdeadline paper Th4.2.2, 2004.

[5] J. M. Simmons, A. A. M. Saleh, E. L. Goldstein, and L. L. Lin, "Optical crossconnects of reduced complexity for WDM networks with bidirectional symmetry," IEEE Photon. Technol. Lett., vol. 10, p. 819-821, Jun. 1998.

We claim:

1. A non-blocking N port optical connection mesh node, $N \geq 3$, for providing a multiple wavelength channel signal with reciprocal bidirectional connectivity between the N node ports, each node port containing an apparatus having an input port and N−1 output ports and comprising either (1) a coupler having an input connected to said input port and having N−1 outputs, (2) a transmissive 1×(N−1) WSS having an input connected to said input port and responsive to a control signal C for establishing a switching connection to one of its N−1 outputs, or (3) a coupler having an input connected to said input port and having X+1 outputs including one output connected to an input of a transmissive 1×Y WSS having Y outputs, where X+Y equals N−1, the sum of the remaining X outputs of the coupler and the Y outputs of the transmissive 1×Y WSS being the N−1 output ports of the node port apparatus and wherein, the node port apparatus provides a total of N−1 output ports and where each of the N−1 output ports from each node port apparatus is connected to a different output port of each of the other N−1 node port apparatuses such that a connection made from one input port of a node port apparatus to an input port of a different node port apparatus always passes through only one WSS and at least one coupler, the connection being established in response to a control signal applied to said one WSS, wherein N is an even number, one node includes only a 1×(N−1) coupler and each of the other N−1 node port apparatuses includes the same sized coupler and each of the other N−1 node port apparatuses includes the same sized transmissive $1 \times K_i$ WSS.

2. A non-blocking N port optical connection mesh node, $N \geq 3$, for providing a multiple wavelength channel signal with reciprocal bidirectional connectivity between the N node ports, each node port containing an apparatus having an input port and N−1 output ports and comprising either (1) a coupler having an input connected to said input port and having N−1 outputs, (2) a transmissive 1×(N−1) WSS having an input connected to said input port and responsive to a control signal C for establishing a switching connection to one of its N−1 outputs, or (3) a coupler having an input connected to said input port and having X+1 outputs including one output connected to an input of a transmissive 1×Y WSS having Y outputs, where X+Y equals N−1, the sum of the remaining X outputs of the coupler and the Y outputs of the transmissive 1×Y WSS being the N−1 output ports of the node port apparatus and wherein, the node port apparatus provides a total of N−1 output ports and where each of the N−1 output ports from each node port apparatus is connected to a different output port of each of the other N−1 node port apparatuses such that a connection made from one input port of a node port apparatus to an input port of a different node port apparatus always passes through only one WSS and at least one coupler, the connection being established in response to a control signal applied to said one WSS wherein N=5 and the distribution of $K_i$ for the transmissive $1 \times K_i$ WSS used at the 5 node port apparatuses is selected from a group of $K_i$ distributions that consist of:

4, 3, 2, 1, 0
4, 2, 2, 2, 0
4, 2, 2, 1, 1
3, 3, 2, 2, 0
3, 3, 2, 1, 1
3, 2, 2, 2, 1 where a $K_i=0$ value indicates that no transmissive $1 \times K_i$ WSS is used at that node port apparatus.

3. A non-blocking N port optical connection mesh node, $N \geq 3$, for providing a multiple wavelength channel signal with reciprocal bidirectional connectivity between the N node ports, each node port containing an apparatus having an input port and N−1 output ports and comprising either (1) a coupler having an input connected to said input port and having N−1 outputs, (2) a transmissive 1×(N−1) WSS having an input connected to said input port and responsive to a control signal C for establishing a switching connection to one of its N−1 outputs, or (3) a coupler having an input connected to said input port and having X+1 outputs including one output connected to an input of a transmissive 1×Y WSS having Y outputs, where X+Y equals N−1, the sum of the remaining X outputs of the coupler and the Y outputs of the transmissive 1×Y WSS being the N−1 output ports of the node port apparatus and wherein, the node port apparatus provides a total of N−1 output ports and where each of the N−1 output ports from each node port apparatus is connected to a different output port of each of the other N−1 node port apparatuses such that a connection made from one input port of a node port apparatus to an input port of a different node port apparatus always passes through only one WSS and at least one coupler, the connection being established in response to a control signal applied to said one WSS wherein N=3 the distribution of $K_i$ for the transmissive $1 \times K_i$ WSS used at the 3 node port apparatuses is:

2, 1, 0, where a $K_i=0$ value indicates that no transmissive $1 \times K_i$ WSS is used at that node port apparatus.

* * * * *

UNITED STATES PATENT AND TRADEMARK OFFICE
CERTIFICATE OF CORRECTION

PATENT NO. : 7,653,306 B2
APPLICATION NO. : 11/434919
DATED : January 26, 2010
INVENTOR(S) : Doerr et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 785 days.

Signed and Sealed this

Twenty-eighth Day of December, 2010

David J. Kappos
*Director of the United States Patent and Trademark Office*